US008224896B2

(12) United States Patent
Knight et al.

(10) Patent No.: US 8,224,896 B2
(45) Date of Patent: Jul. 17, 2012

(54) METHODS AND APPARATUSES FOR LOCATING AND CONTACTING AN INVITED PARTICIPANT OF A MEETING

(75) Inventors: David Knight, Belmont, CA (US); Elaine Montgomery, Redwood City, CA (US); Steffan Matt, Campbell, CA (US)

(73) Assignee: Cisco Technology, Inc., San Jose, CA (US)

( * ) Notice: Subject to any disclaimer, the term of this patent is extended or adjusted under 35 U.S.C. 154(b) by 431 days.

(21) Appl. No.: 11/549,547

(22) Filed: Oct. 13, 2006

(65) Prior Publication Data

US 2007/0244969 A1 Oct. 18, 2007

Related U.S. Application Data

(60) Provisional application No. 60/739,227, filed on Nov. 23, 2005.

(51) Int. Cl.
*G06F 15/16* (2006.01)

(52) U.S. Cl. ........ 709/204; 709/203; 709/205; 709/206; 709/207; 709/208; 709/209; 370/260; 370/352; 379/202.01; 455/414.1

(58) Field of Classification Search ........... 709/203–209
See application file for complete search history.

(56) References Cited

U.S. PATENT DOCUMENTS

| | | | |
|---|---|---|---|
| 5,793,840 A * | 8/1998 | Zhuang et al. .......... 379/47 |
| 6,501,739 B1 * | 12/2002 | Cohen ............ 370/260 |
| 6,711,154 B1 * | 3/2004 | O'Neal ............ 370/352 |
| 6,801,610 B1 * | 10/2004 | Malik ......... 379/202.01 |
| 6,993,327 B2 * | 1/2006 | Mathis ............ 455/414.1 |
| 6,999,731 B2 * | 2/2006 | Cronin ............ 455/88 |
| 7,149,293 B1 * | 12/2006 | Coppage et al. ....... 379/114.2 |
| 7,196,630 B2 * | 3/2007 | Baker ............ 340/573.1 |
| 7,379,733 B2 * | 5/2008 | Maes et al. ......... 455/414.1 |
| 7,587,457 B2 * | 9/2009 | Fujibayashi ......... 709/206 |
| 7,664,724 B2 * | 2/2010 | Lucovsky et al. ......... 707/781 |
| 7,769,154 B1 * | 8/2010 | Craft et al. ............ 379/207.12 |
| 7,844,055 B2 * | 11/2010 | Mukherjee et al. ......... 380/250 |
| 7,925,241 B2 * | 4/2011 | Helvick ............ 455/412.2 |
| 7,925,525 B2 * | 4/2011 | Chin ............ 705/7.19 |
| 2001/0054064 A1 * | 12/2001 | Kannan ............ 709/203 |
| 2003/0020623 A1 * | 1/2003 | Cao et al. ............ 340/686.6 |
| 2003/0021400 A1 * | 1/2003 | Grandgent et al. ...... 379/202.01 |
| 2003/0037146 A1 * | 2/2003 | O'Neill ............ 709/226 |
| 2003/0208601 A1 * | 11/2003 | Campbell et al. ......... 709/227 |
| 2003/0217099 A1 * | 11/2003 | Bobde et al. ......... 709/202 |
| 2004/0024834 A1 * | 2/2004 | Alegria et al. ......... 709/213 |
| 2004/0044789 A1 * | 3/2004 | Angel et al. ............ 709/238 |
| 2004/0047461 A1 * | 3/2004 | Weisman et al. ........ 379/202.01 |
| 2005/0027830 A1 * | 2/2005 | Florkey et al. ............ 709/220 |
| 2005/0068167 A1 * | 3/2005 | Boyer et al. ............ 340/531 |

(Continued)

OTHER PUBLICATIONS

IBM "Meeting attendance phone server for augmenting calendar tool pop-ups involves adding button including suitable messages concerned user's time schedule," IBM Technical Bulletin RD 429145, Jan. 10, 2000.*

*Primary Examiner* — Backhean Tiv (57) ABSTRACT

In one embodiment, the methods and systems detect a meeting; detect a missing participant scheduled to attend the meeting; identify a device actively utilized by the missing participant; and transmit a reminder message to the device.

17 Claims, 5 Drawing Sheets

U.S. PATENT DOCUMENTS

| | | | |
|---|---|---|---|
| 2006/0067250 A1* | 3/2006 | Boyer et al. | 370/260 |
| 2006/0123456 A1* | 6/2006 | Dei | 725/146 |
| 2006/0143220 A1* | 6/2006 | Spencer, Jr. | 707/102 |
| 2006/0234735 A1* | 10/2006 | Digate et al. | 455/466 |
| 2006/0239212 A1* | 10/2006 | Pirzada et al. | 370/260 |
| 2007/0172043 A1* | 7/2007 | Keller | 379/202.01 |

* cited by examiner

METHODS AND APPARATUSES FOR LOCATING AND CONTACTING AN INVITED PARTICIPANT OF A MEETING

CROSS-REFERENCE TO RELATED APPLICATION

This application claims the benefit of U.S. Provisional Application Ser. No. 60/739,227 filed Nov. 23, 2005, which application is incorporated herein by reference.

FIELD OF INVENTION

The present invention relates generally to locating an invited participant and, more particularly, to locating and contacting an invited participant of a meeting.

BACKGROUND

People frequently schedule meetings with others. Many times, people track their meeting schedules through either a paper calendar or an electronic calendar. The use of electronic calendars such as Outlook® is becoming more and more popular for ease of use and versatility. Electronic calendars provide additional reminder functionality over paper calendars that reminds the user via visual and/or audio messages through an electronic device.

Even with advances in and increased use of electronic calendars, users may still forget to attend scheduled meetings. Further, these users may be be actively monitoring their electronic calendars to realize that they are currently missing a scheduled meeting.

SUMMARY

In one embodiment, the methods and systems detect a meeting; detect a missing participant scheduled to attend the meeting; identify a device actively utilized by the missing participant; and transmit a reminder message to the device.

BRIEF DESCRIPTION OF THE DRAWINGS

The accompanying drawings, which are incorporated in and constitute a part of this specification, illustrate and explain one embodiment of the methods and apparatuses for locating and contacting an invited participant of a meeting. In the drawings.

DETAILED DESCRIPTION

The following detailed description of the methods and apparatuses for locating and contacting an invited participant of a meeting refers to the accompanying drawings. The detailed description is not intended to limit the methods and apparatuses for locating and contacting an invited participant of a meeting. Instead, the scope of the methods and apparatuses for locating and contacting an invited participant of a meeting is defined by the appended claims and equivalents. Those skilled in the art will recognize that many other implementations are possible, consistent with the present invention.

References to a device include a device utilized by a user such as a desktop computer, a portable computer, a personal digital assistant, a video phone, a landline telephone, a cellular telephone, and a device capable of receiving/transmitting an electronic signal. Further, references to a device also include applications such as text messaging, instant messaging, and electronic mail (email).

References to a meeting include any communications between multiple parties via telephone, face-to-face, and digital means.

References to a collaboration session include a plurality of devices that are configured to view content submitted by one of the devices. For example, the collaboration session may include a data conference or a video conference through a network, a phone line, and/or the Internet. Further, the communications between participants may be through text messaging, audio conferencing, video conferencing, email, short messaging service, and the like.

References to a participant include a user of a device that participates or is scheduled to participate in the collaboration session.

References to a presenter include a participant that shares content shared with other participants.

References to an attendee include a participant that receives content shared by another participant. The attendees are capable of viewing content that is offered by the presenter. In some instances, the attendee is capable of modifying the content shared by the presenter.

Figure 1:
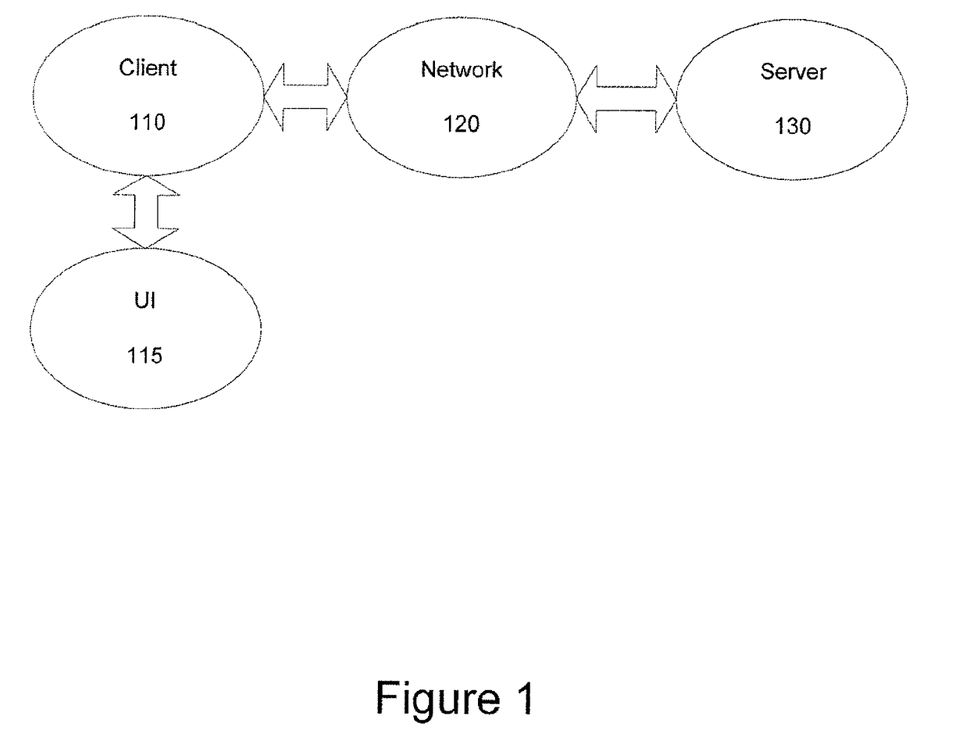
FIG. 1 is a diagram illustrating an environment within which the methods and apparatuses for locating and contacting an invited participant of a meeting are implemented.

FIG. 1 is a diagram illustrating an environment within which the methods and apparatuses for locating and contacting an invited participant of a meeting are implemented. The environment includes an electronic device 110 (e.g., a computing platform configured to act as a client device, such as a computer, a personal digital assistant, and the like), a user interface 115, a network 120 (e.g., a local area network, a home network, the Internet), and a server 130 (e.g., a computing platform configured to act as a server).

In one embodiment, one or more user interface 115 components are made integral with the electronic device 110 (e.g., keypad and video display screen input and output interfaces in the same housing such as a personal digital assistant. In other embodiments, one or more user interface 115 components (e.g., a keyboard, a pointing device such as a mouse, a trackball, etc.), a microphone, a speaker, a display, a camera are physically separate from, and are conventionally coupled to, electronic device 110. In one embodiment, the user utilizes interface 115 to access and control content and applications stored in electronic device 110, server 130, or a remote storage device (not shown) coupled via network 120.

In accordance with the invention, embodiments of locating and contacting an invited participant of a meeting below are executed by an electronic processor in electronic device 110, in server 130, or by processors in electronic device 110 and in server 130 acting together. Server 130 is illustrated in FIG. 1 as being a single computing platform, but in other instances are two or more interconnected computing platforms that act as a server.

Figure 2:
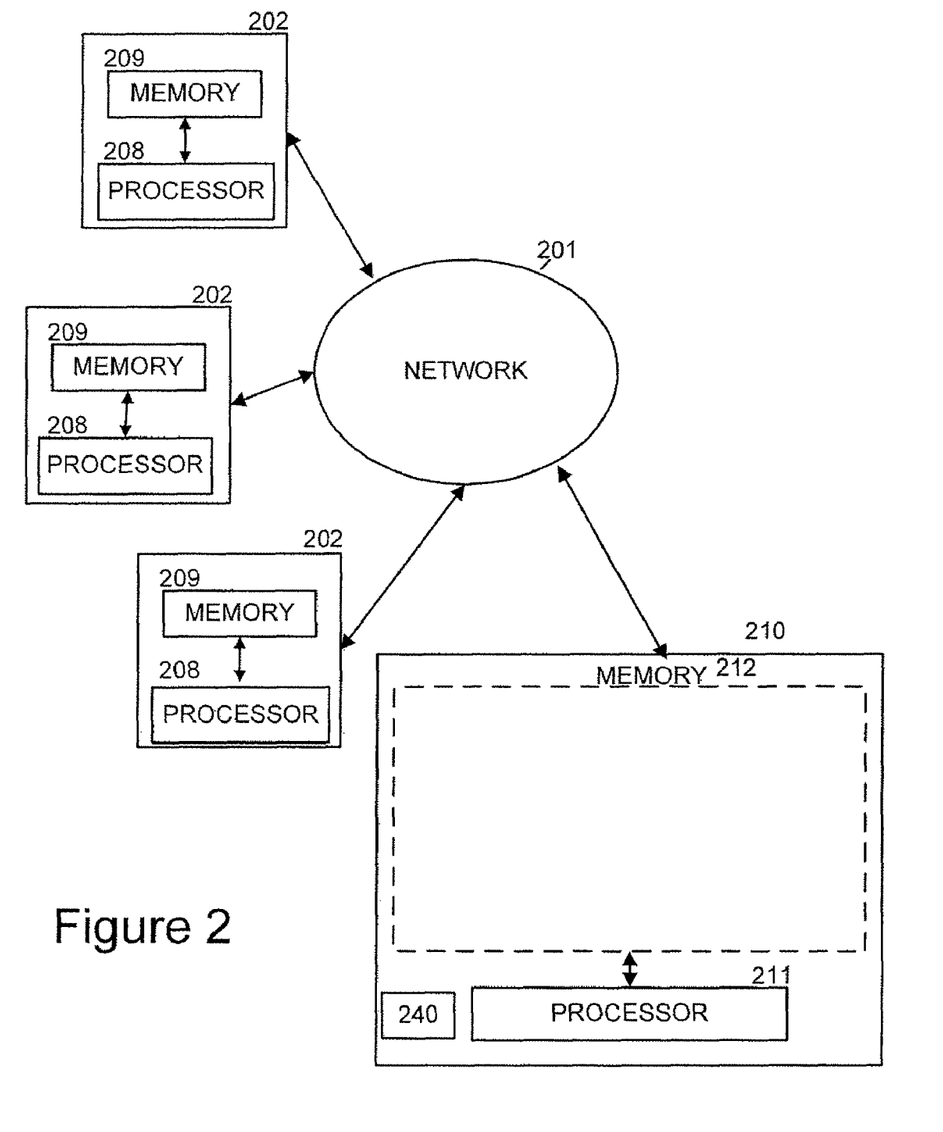
FIG. 2 is a simplified block diagram illustrating one embodiment in which the methods and apparatuses for locating and contacting an invited participant of a meeting are implemented.

FIG. 2 is a simplified diagram illustrating an exemplary architecture in which the methods and apparatuses for locating and contacting an invited participant of a meeting are implemented. The exemplary architecture includes a plurality of electronic devices 202, a server device 210, and a network 201 connecting electronic devices 202 to server 210 and each electronic device 202 to each other. The plurality of electronic devices 202 are each configured to include a computer-readable medium 209, such as random access memory, coupled to an electronic processor 208. Processor 208 executes program instructions stored in the computer-readable medium 209. In one embodiment, a unique user operates each electronic device 202 via an interface 115 as described with reference to FIG. 1.

The server device 130 includes a processor 211 coupled to a computer-readable medium 212. In one embodiment, the server device 130 is coupled to one or more additional external or internal devices, such as, without limitation, a secondary data storage element, such as database 240.

In one instance, processors 208 and 211 are manufactured by Intel Corporation, of Santa Clara, Calif. In other instances, other microprocessors are used.

In one embodiment, the plurality of client devices 202 and the server 210 include instructions for extending a dynamic social network system. In one embodiment, the plurality of computer-readable media 209 and 212 contain, in part, the customized application. Additionally, the plurality of client devices 202 and the server 210 are configured to receive and transmit electronic messages for use with the customized application. Similarly, the network 210 is configured to transmit electronic messages for use with the customized application.

One or more user applications are stored in media 209, in media 212, or a single user application is stored in part in one media 209 and in part in media 212. In one instance, a stored user application, regardless of storage location, is made customizable based on locating and contacting an invited participant of a meeting as determined using embodiments described below.

In one embodiment, the network system utilizes the collaboration sessions to share information and communicate among the participants. For example, collaboration sessions are configured to provide real-time communication between multiple participants. In one embodiment, the content that is shared among the participants of the collaboration session is content that is displayed on the desktop of one of the participants.

Figure 3:
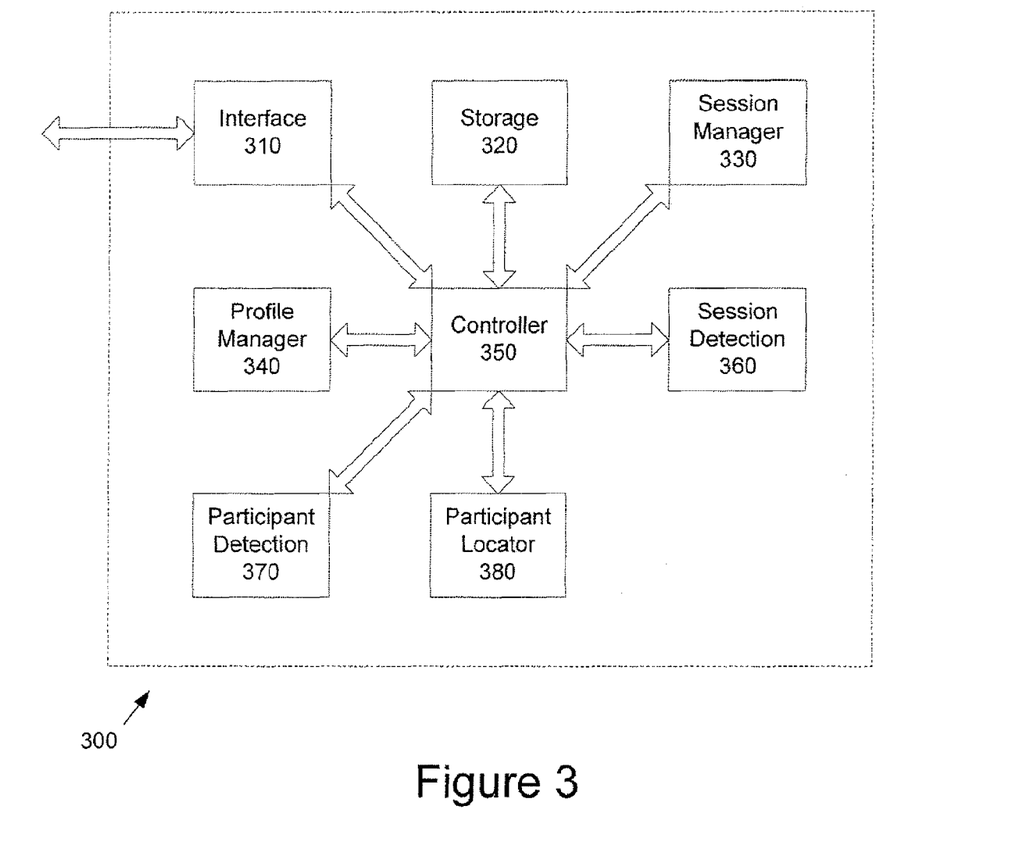
FIG. 3 is a simplified block diagram illustrating a system, consistent with one embodiment of the methods and apparatuses for locating and contacting an invited participant of a meeting.

FIG. 3 illustrates one embodiment of a system 300. In one embodiment, the system 300 is embodied within the server 130. In another embodiment, the system 300 is embodied within the electronic device 110. In yet another embodiment, the system 300 is embodied within both the electronic device 110 and the server 130.

In one embodiment, the system 300 includes an interface module 310, a storage module 320, a session manager module 330, a profile manager module 340, a control module 350, a session detection module 360, a participant detection module 370, and a participant locator module 380.

In one embodiment, the control module 350 communicates with the interface module 310, the storage module 320, the session manager module 330, the profile manager module 340, the session detection module 360, the participant detection module 370, and the participant locator module 380. In one embodiment, the control module 350 coordinates tasks, requests, and communications between interface module 310, the storage module 320, the session manager module 330, the profile manager module 340, the session detection module 360, the participant detection module 370, and the participant locator module 380.

In one embodiment, the interface module 310 receives a signal from one of the electronic devices 110. In one embodiment, the electronic devices 110 are participating in a collaboration session. For example, the system 300 monitors the collaboration session between the presenter device and the attendee device. In another embodiment, the interface module 310 delivers a signal to one of the electronic devices 110.

In one embodiment, the interface module 310 monitors input from various interface devices connected to devices that are participating in the collaboration session or planning a future collaboration session. These various interface devices include a keyboard, a pointing device, a microphone, a telephone, a video camera, and the like.

In one embodiment, the storage module 320 stores a record including a list of attributes associated with the each device participating in a collaboration session. In one embodiment, each device corresponds with an invited participant within a collaboration session. An exemplary list of attributes is shown in a record 400 within FIG. 4.

Figure 4:
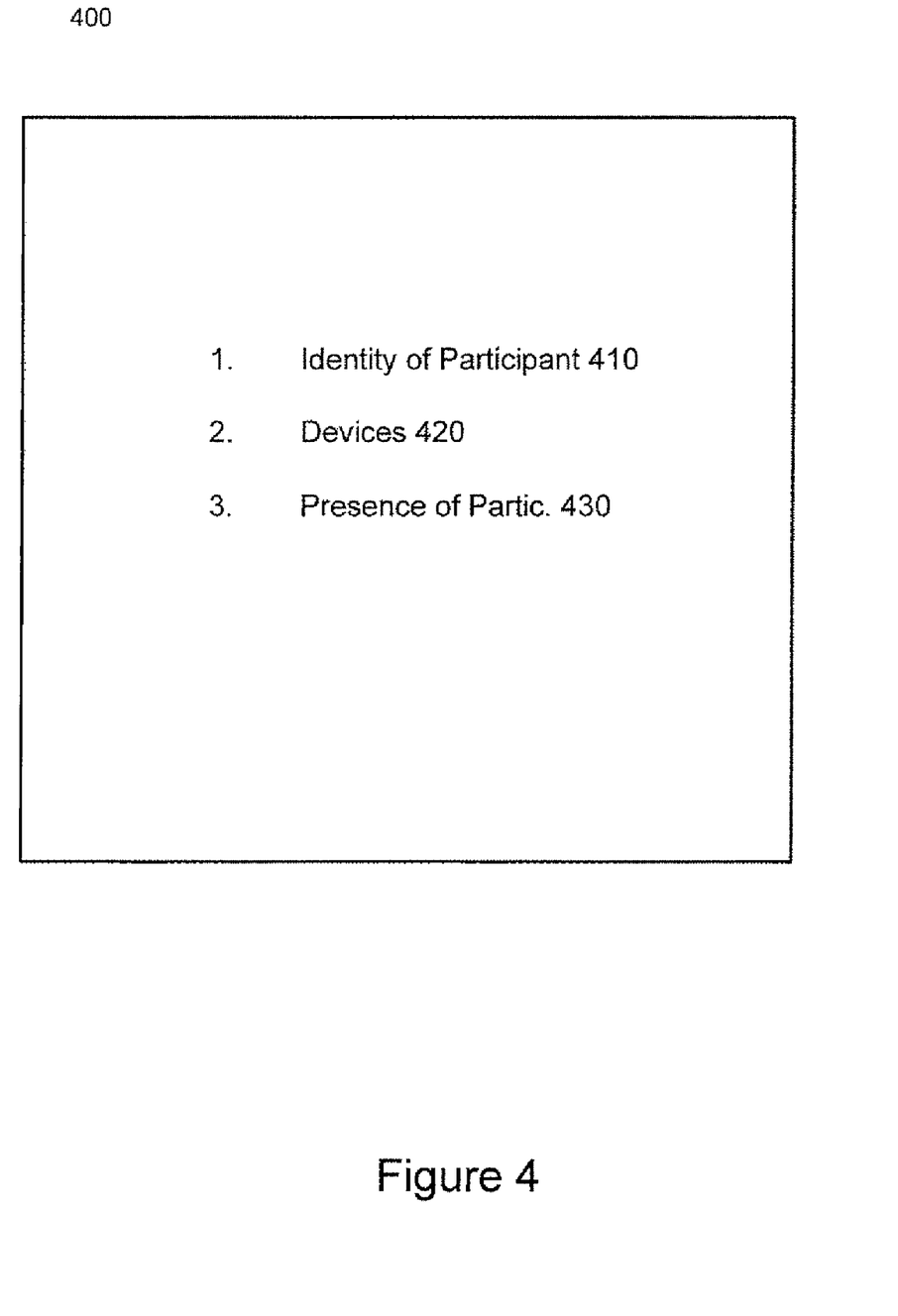
FIG. 4 is an exemplary record for use with the methods and apparatuses for locating and contacting an invited participant of a meeting.

In another embodiment, the record 400 may be organized based on the participant. For example, each participant can be associated with multiple devices, and the record 400 can be associated with a particular participant. Within the record 400 associated with a particular participant, a listing of multiple devices associated with the particular participant is listed. Each device can have a profile or list of attributes associated with each respective device.

In another embodiment, the storage module 320 stores the collaboration session. In one embodiment, the storage module 320 stores the content that is presented during the collaboration session. In another embodiment, the storage module 320 stores the annotations and comments produced by the participants of the collaboration session.

In one embodiment, the session module 330 schedules a collaboration session. In one embodiment, the time and date of the collaboration session are scheduled. In another embodiment, the invited participants are notified of the upcoming collaboration session.

In yet another embodiment, the responses from the invited participants are detected. For example, the responses regarding attending the upcoming collaboration session by the invited participants may include acceptance of the upcoming collaboration session, rejection of the upcoming collaboration session, or unsure of the upcoming collaboration session.

In one embodiment, the profile manager module 340 organizes a plurality of profiles. In one embodiment, each profile corresponds to each individual user. In another embodiment, each individual user may have multiple profiles. In one embodiment, a profile describes attributes of the associated user.

In one embodiment, the session detection module 360 tracks collaboration sessions. In one embodiment, future collaboration sessions and current collaboration sessions in progress are tracked.

In one embodiment, the participant detection module 370 detects invited participants within a collaboration session. In one embodiment, the participants that have accepted or are unsure of accepting the invitation to the particular collaboration session are detected. For example, invited participants that have declined to attend the particular collaboration session are not detected in one embodiment.

In one embodiment, the participant locator module 380 detects the presence of the invited participants. Further, the type of device that is utilized by the invited participants is also detected in one embodiment.

The system 300 in FIG. 3 is shown for exemplary purposes and is merely one embodiment of the methods and apparatuses for locating an expert during a collaboration session. Additional modules may be added to the system 300 without departing from the scope of the methods and apparatuses for extending a dynamic social network system. Similarly, modules may be combined or deleted without departing from the scope of the methods and apparatuses for locating an expert during a collaboration session.

FIG. 4 illustrates an exemplary record 400 for use with the methods and apparatuses for locating and contacting an invited participant of a meeting. In one embodiment, the record 400 illustrates an exemplary record associated with a profile corresponding to a user. In one embodiment, the profile associated with an invited participant of a meeting. Further, the profile associated with the user is updated and refined based on the devices associated with the user and the presence of the user with respect to each associated device.

In one embodiment, there are multiple records such that each record 400 is associated with a particular profile corresponding to a particular user. In another embodiment, multiple profiles are associated with the same user and each profile is represented by a record 400.

In one embodiment, the record 400 includes an identity of the participant field 410, a devices field 420, and a presence field 430.

In one embodiment, the record 400 resides within the storage module 320. In one embodiment, the record 400 describes an attributes detected through the system 300.

In one embodiment, the identity of participant field 410 includes information related to an individual participant corresponding to the record 400. For example, the identity of the participant may include a user name with a password to authenticate the true identity of the participant.

In another embodiment, the identity of the participant may be performed by recognizing the particular device that is listed within the field 420. For example, each device can be uniquely identifiable by a serial number or a device number. Usage of a particular device listed within the field 420 can be correlated to a particular participant.

In one embodiment, the device field 420 lists the devices corresponding to the participant identified within the field 410. In one embodiment, the device field 420 includes a device type, a device model, and a unique device identifier. For example, the device types include electronic mail, instant messenger, a pager, a cellular phone, a land line, and the like.

Figure 5:
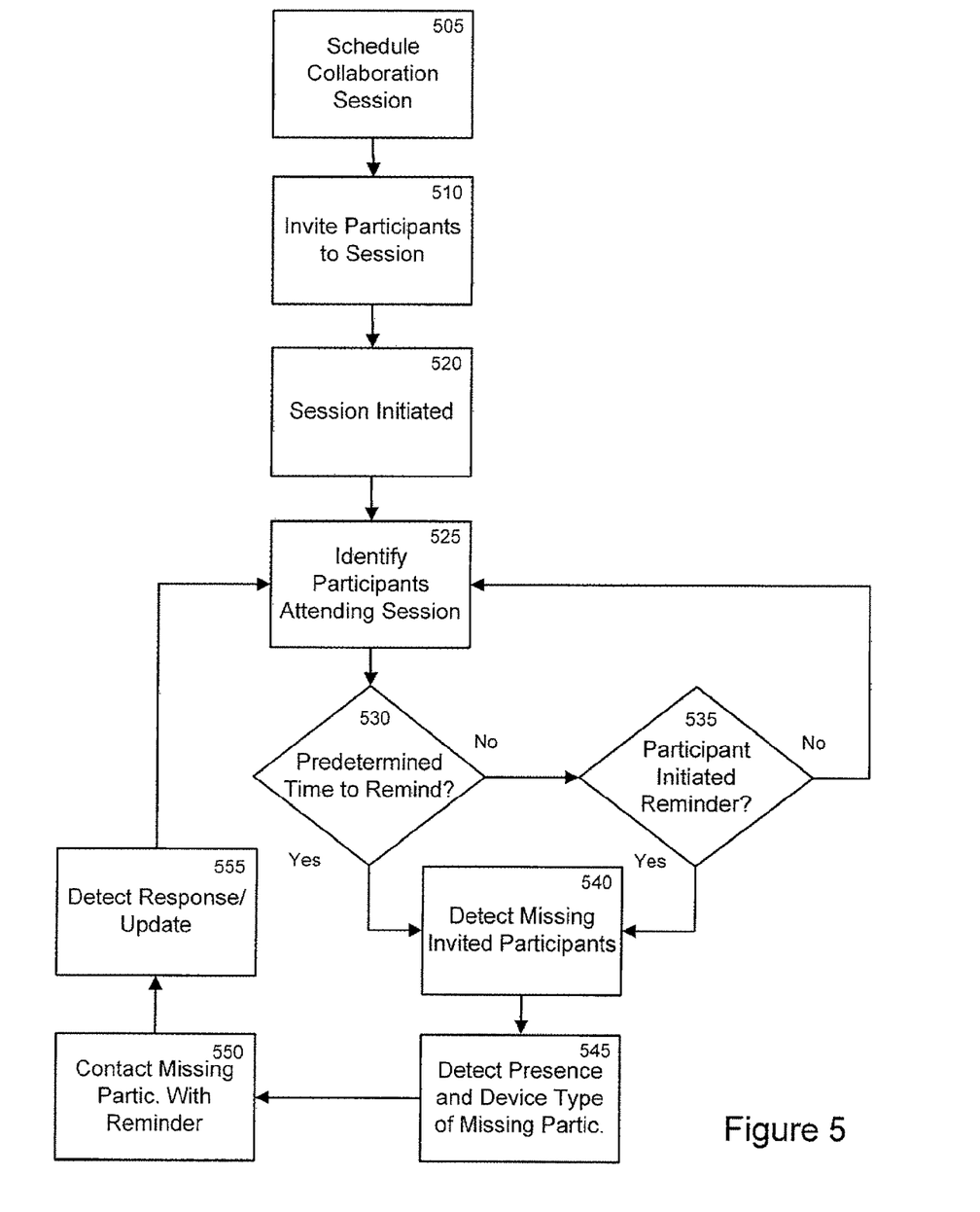
FIG. 5 is a flow diagram consistent with one embodiment of the methods and apparatuses for locating and contacting an invited participant of a meeting.

In one embodiment, the presence field 430 lists the presence of the participant on each of the devices listed within the field 420. For example, the The flow diagram as depicted in FIG. 5 is one embodiment of the methods and apparatuses for locating and contacting an invited participant of a meeting. The blocks within the flow diagrams can be performed in a different sequence without departing from the spirit of the methods and apparatuses for locating and contacting an invited participant of a meeting. Further, blocks can be deleted, added, or combined without departing from the spirit of the methods and apparatuses for locating and contacting an invited participant of a meeting.

The flow diagram in FIG. 5 illustrates locating and contacting an invited participant of a meeting. The meeting illustrated within FIG. 5 is a collaboration session. However, any type of meeting may be utilized without departing from the scope of the invention.

In Block 505, a collaboration session is scheduled. In one embodiment, the presenter schedules the collaboration session for a future time. In one instance, the collaboration session includes sharing a combination of voice and/or visual data. In one embodiment, the visual data includes textual information, graphical information, and the like. In one embodiment, the session manager module 330 helps in scheduling the collaboration session.

In Block 510, participants are invited to the collaboration session. In one embodiment, the invited participants respond with either an acceptance, a rejection, or an unsure status of attending the collaboration session. In one embodiment, the session manager module 330 coordinates the invitation of the invited participants and tracks the invitation responses from the invited participants.

In Block 520, the collaboration session is initiated. In one embodiment, the session detection module 360 detects the initiation of the collaboration session.

In Block 525, the participants attending the collaboration session are identified. In one embodiment, the participant detection module 370 detects the presence of the invited participants within the collaboration session.

In Block 530, the predetermined time to remind the invited participants is detected. In one embodiment, the predetermined time to remind the invited participants may be prior to the scheduled start time of the collaboration session. In another embodiment, the predetermined time to remind the invited participants may be after the scheduled start time of the collaboration session.

For example, the predetermined time to remind may occur 15 minutes prior to the scheduled start time of the collaboration session, at the scheduled start time of the collaboration session, or 10 minutes after the scheduled start time of the collaboration session. In yet another embodiment, the predetermined time to remind the invited participants may occur 10 minutes after the actual start time of the collaboration session which may be after or prior to the scheduled start time of the collaboration session.

If it is not the predetermined time to remind the invited participants in the Block 530, then a participant initiated reminder is detected in Block 535.

In one embodiment, either the presenter or the attendees are capable of initiating a reminder to the invited participants that are not currently attending the collaboration session.

If there is no participant initiated reminder detected in the Block 535, then participants that are attending the collaboration are detected and identified in the Block 525.

If either the predetermined time to remind is detected or a participant initiated reminder is detected, then the missing invited participants are detected in Block 540. In one embodiment, the missing invited participants are determined based on the invited participants to the collaboration session in the Block 510 while subtracting the invited participant currently participating in the collaboration session as shown in the Block 525.

In another embodiment, the missing invited participants are determined based on the invited participants to the collaboration session in the Block 510 while subtracting the invited participant currently participating in the collaboration session as shown in the Block 525 and subtracting the invited participants that declined the invitation to the collaboration session. Recall that in one embodiment, the session manager module 330 tracks the invitation responses from the invited participants.

In Block 545, the presence and device type of the missing invited participants are detected. In one embodiment, a profile (as shown in record 400) of the missing invited participant is detected. From the profile information, the devices associated with each missing invited participant are detected. Further, the presence information for each of these devices is also determined.

In Block 550, the missing invited participants are contacted at their devices with a reminder message for the collaboration session. In one embodiment, the device(s) chose to send the reminder message is based on the presence of the missing invited participant on the corresponding device. For example, if the missing invited participant is active on their instant messaging account, then the reminder message is sent to their instant messaging account. However, if the presence of the missing invited participant is not found on any corresponding devices, then the reminder message may be sent to all the devices corresponding to the missing invited participant.

In one embodiment, the reminder message is customized based on the device type. For example, if the device type is a cellular phone with text messaging capability, the reminder message may be specifically formatted as a text message. In another embodiment, if the device type supports voice, the reminder message may be formatted as an audio message.

In one embodiment, the reminder message allows the missing invited participant to join the collaboration session, to indicate that the participant will join the collaboration session, and to indicate that the participant declines to join the collaboration session. For example, utilizing a textual reminder via email, the missing invited participant is capable of selecting a hyperlink that allows them to join the collaboration session or select a choice between joining the collaboration session at a later time and declining to join the collaboration session. In another example, utilizing an audio reminder via a telephone, a phone menu is utilized that allows the missing invited participant to use voice or keypad activation to join the collaboration session or select a choice between joining the collaboration session at a later time and declining to join the collaboration session.

In Block 555, an answer by the missing invited participant based on the response from the reminder message in the Block 550 is detected. If the answer results in joining the collaboration session, declining the collaboration session, or joining the collaboration session at a later time, then no further reminder messages are sent to the particular invited participant. However, if no answer is received, then the particular missing invited participant may be sent another reminder message at a later time for the same collaboration session.

In one embodiment, the determination that no answer will be received occurs at a predetermined time after the reminder is sent in the Block 550.

After either the answer is received or the determination that no answer will be received, then participants that are attending the collaboration are detected and identified in the Block 525.

The foregoing descriptions of specific embodiments of the invention have been presented for purposes of illustration and description. The invention may be applied to a variety of other applications.

They are not intended to be exhaustive or to limit the invention to the precise embodiments disclosed, and naturally many modifications and variations are possible in light of the above teaching. The embodiments were chosen and described in order to explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method comprising:
   detecting, by a processor, a start of a collaboration session;
   detecting a predetermined time after the start of the collaboration session to remind invited participants of the collaboration session;
   when it is the predetermined time to remind invited participants of the collaboration session,
      detecting a missing invited participant who did not previously decline an invitation to attend the collaboration session, wherein the missing invited participant is associated with a plurality of devices,
      identifying a presence of the missing invited participant on a particular device of the plurality of devices associated with the missing invited participant,
      identifying a device type of the particular device of the plurality of devices associated with the missing invited participant, and
      transmitting a reminder message that is customized based on a capability of the particular device to the particular device of the plurality of devices associated with the missing invited participant, the reminder message to inform the missing invited participant of the start of the collaboration session; and
   when it is not the predetermined time to remind invited participants of the collaboration session, but a participant has initiated a reminder message, in response to the participant initiated reminder message,
      detecting a missing invited participant who did not previously decline an invitation to attend the collaboration session, wherein the missing invited participant is associated with a plurality of devices,
      identifying a presence of the missing invited participant on a particular device of the plurality of devices associated with the missing invited participant,
      identifying a device type of the particular device of the plurality of devices associated with the missing invited participant, and
      transmitting a participant initiated reminder message that is customized based on the capability of the particular device to the particular device of the plurality of devices associated with the missing invited participant, the participant initiated reminder message to inform the missing invited participant of the start of the collaboration session.

2. The method according to claim 1 further comprising:
   detecting an answer to the reminder message, wherein the answer is transmitted by the particular device associated with the missing invited participant.

3. The method according to claim 1 wherein transmitting a reminder message further comprises:
   transmitting a reminder message that comprises a link configured to enable the missing invited participant to directly join the collaboration session by selecting the link within the reminder message.

4. The method according to claim 1 wherein the particular device a device is one of a cellular telephone, a land line telephone, a device including an instant messaging application, a device including an email application, a device including a text messaging application, or a paging device.

5. The method according to claim 1 further comprising:
   detecting a missing invited participant that was scheduled to attend the collaboration session.

6. The method according to claim 1 wherein the capability is one of an audio capability, a video capability, an image display capability, a textual display capability, a graphical display capability, or a tactile feedback capability.

7. The method according to claim 1 further comprising locating the missing invited participant.

8. The method according to claim 1 further comprising:
transmitting the reminder message only to the particular device identified as having the presence of the missing invited participant.

9. The method according to claim 1 wherein detecting a missing invited participant comprises:
subtracting participants participating in the collaboration session from invited participants.

10. The method according to claim 1 wherein detecting a missing invited participant comprises:
subtracting participants participating in the collaboration session and participants who declined an invitation to join the collaboration session from invited participants.

11. A system comprising:
a processor; and
a memory configured to store a plurality of software modules executable by the processor, the software modules configured to:
detect a start of a collaboration session,
detect a predetermined time after the start of the collaboration session to remind invited participants of the collaboration session,
when it is the predetermined time to remind the invited participants of the collaboration session,
detect a missing invited participant who did not previously decline an invitation to attend the collaboration session, wherein the missing invited participant is associated with a plurality of devices,
identify a presence of the missing invited participant on a particular device of the plurality of devices associated with the missing invited participant,
identify a device type of the particular device of the plurality of devices associated with the missing invited participant, and
send a reminder message that is customized based on a capability of the particular device to the particular device of the plurality of devices associated with the missing invited participant, the reminder message to inform the missing invited participant of the start of the collaboration session that the missing invited participant was invited to; and
when it is not the predetermined time to remind invited participants of the collaboration session, but a participant has initiated a reminder message, in response to the participant initiated message,
detect a missing invited participant who did not previously decline an invitation to attend the collaboration session, wherein the missing invited participant is associated with a plurality of devices,
identify a presence of the missing invited participant on a particular device of the plurality of devices associated with the missing invited participant,
identify a device type of the particular device of the plurality of devices associated with the missing invited participant, and
send a participant initiated reminder message that is customized based on a capability of the particular device to the particular device of the plurality of devices associated with the missing invited participant, the reminder message to inform the missing invited participant of the start of the collaboration session that the missing invited participant was invited to.

12. The system according to claim 11 wherein the software modules are further configured to store profile information relating to each of the plurality of invited participants.

13. The system according to claim 12 wherein the capability is one of an audio capability, a video capability, an image display capability, a textual display capability, a graphical display capability, or a tactile feedback capability.

14. The system according to claim 11 wherein the particular device is one of a cellular telephone, a land line telephone, a device including an instant messaging application, a device including an email application, a device including a text messaging application, or a paging device.

15. The system according to claim 11 wherein the modules are further configured to send the reminder message only to the particular device identified as having the presence of the missing invited participant.

16. The system according to claim 11 wherein the missing invited participant is determined by subtracting participants participating in the collaboration session from invited participants.

17. The system according to claim 11 wherein the missing invited participant is determined by subtracting participants participating in the collaboration session and participants who declined an invitation to join the collaboration session from invited participants.

* * * * *

UNITED STATES PATENT AND TRADEMARK OFFICE
CERTIFICATE OF CORRECTION

| | | |
|---|---|---|
| PATENT NO. | : 8,224,896 B2 | Page 1 of 1 |
| APPLICATION NO. | : 11/549547 | |
| DATED | : July 17, 2012 | |
| INVENTOR(S) | : David Knight et al. | |

It is certified that error appears in the above-identified patent and that said Letters Patent is hereby corrected as shown below:

On the Title page of the patent, section (75) Inventors:, replace "Steffan Matt" with -- Steffen Matt --.

Signed and Sealed this
Twenty-third Day of October, 2012

David J. Kappos
*Director of the United States Patent and Trademark Office*